UNITED STATES PATENT OFFICE.

WILLIAM H. LANDERS, OF NEW YORK, N. Y., ASSIGNOR OF ONE-HALF TO HENRY S. LOUD, OF NEW YORK, N. Y.

PROCESS OF MAKING ALKALINE SULFID.

1,374,209.     Specification of Letters Patent.     Patented Apr. 12, 1921.

No Drawing.     Application filed November 17, 1919. Serial No. 338,724.

*To all whom it may concern:*

Be it known that I, WILLIAM H. LANDERS, a citizen of the United States, residing at New York city, borough of Manhattan, county and State of New York, have invented a new and useful Improvement in Processes of Making Alkaline Sulfid, &c., of which the following is a specification.

This invention relates to the manufacture of sodium sulfid and has for its principal objects the economical production of said product and also by-products by the utilization in such manufacture of raw materials, such for example as sludge acids from the petroleum industry, that are of little or no value and in fact the waste sludge acids are commonly discarded in such large quantities as to pollute rivers or harbors or else to render their ultimate disposal a serious problem.

Heretofore in the manufacture of sodium sulfid it has been common to effect the reduction of salt cake (normal sodium sulfate) with powdered coal by heating the same to the melting point for the requisite period of time to effect reduction to sulfid. Not only did the employment of coal require that the same be very finely pulverized, if an intimate mixture of the same with the salt cake was to be accomplished, but the actual mixing operation entailed an expense and also generally failed to produce the homogeneous and intimate mixture desired, owing to the tendency of the particles to ball up. As a consequence of the operation of this process the yield was often very uncertain.

My investigations have led to the discovery that sludge acids, resulting from the refining or other treatment of petroleum and other oils and comprising sulfuric acid with varying percentages of free and (or) combined carbon, hydrocarbon or organic compounds of carbon, hydrogen and oxygen, especially so-called sludge tar-acids, are peculiarly adapted for making sodium sulfid from an alkali-metal chlorid or nitrate, since not only can these materials be readily mixed at a minimum of expense with such a salt, but the resultant salt cake or niter cake will contain the carbonaceous reducing agent in such an extremely fine or minute state of sub-division that it is possible to obtain a most intimate and homogeneous mixture of such reducing agent with the substance to be reduced, so that the reducing action is much more effective and the process more reliable than is the case when coal or coke is employed.

In carrying out my invention, I preferably proceed as follows:

Sludge acid, preferably so-called sludge tar-acid from petroleum oil refineries, such grade for example as acid containing large quantities of free and (or) combined sulfuric acid and carbon, is mixed with ordinary salt or sodium nitrate in the proportions of approximately six parts of salt cake (figured as $Na_2SO_4$) to each part of carbon and (or) its equivalent in any other reducing agent present in said acid and the mixture is then heated preferably to under a dull red heat (700° F.) to expedite the reaction whereby the salt is converted to a carboniferous normal or acid sulfate and volatile mineral acid is evolved, without appreciable burning of the carbon.

The said carboniferous alkali-metal sulfate or acid sulfate which contains homogeneously, intimately divided free and (or) combined carbon particles, is then heated at a much higher temperature, for example to approximately 2000° F. in order to melt any alkali-metal sulfid formed, the reduction of the same being carried out in the manner customary in the manufacture of sodium sulfid from salt cake and powdered coal, with the exception that in most cases the expense of the purification treatment now actually resorted to to obtain sulfid of high purity is unnecessary owing to the fact that the reducing agent employed in my process is of itself substantially ashless as contrasted with the relatively high ash content of ordinary coal or coke reducing agents such as above referred to.

The result of such furnacing is the formation of free salt cake or niter cake, depending on the sulfuric acid content of the sludge acid employed on the one hand and also depending upon whether an alkali-metal chlorid or nitrate is the substance subjected to the treatment. Preferably in order to determine the quantity of sludge acid to be employed, the calculation is based upon its content of carbon or its equivalent in hydrocarbon both free and combined or other reducing agents, as hydrogen for example. In those cases where the acid content of the sludge acid is insufficient to accomplish the desired reaction, when using the quantity of the same that is required by the foregoing basis of calculation, additional commercial sulfuric acid is added. The volatile mineral acid, viz: hydrochloric or nitric acid which is evolved in the first furnacing operation is recovered in the manner now customary in the manufacture of said acids from their corresponding alkali-metal salts.

The reactions in the foregoing process are substantially represented by the following equations:

$$NaCl + H_2SO_4 = NaHSO_4 + HCl$$

$$2NaCl + H_2SO_4 = Na_2SO_4 + 2HCl$$

$$Na_2SO_4 + 2C = Na_2S + 2CO_2$$

$$2NaHSO_4 + 4C = Na_2S + 4CO_2 + H_2S$$

The incidental side reactions which result in the destruction of any $SO_3$ or $SO_2$ fumes are the following:

$$3SO_3 + H_2S = 4SO_2 + H_2O$$

$$2H_2S + SO_2 = 2H_2O + 3S$$

In the petroleum sludge tar-acid the acid exists largely as free sulfuric acid distributed as small globules throughout the tarry mass.

By my process as above stated it is possible to produce the sulfid of high purity without resorting to the expense of the purification treatment now actually required immediately after the reduction operation in the furnace, since my reducing agent is itself substantially ashless as compared with the relatively high percentage of ash contained in ordinary coal or coke reducing agents herein referred to.

Having thus described my invention what I claim and desire to secure by U. S. Letters Patent is:

1. The process of making an alkali-metal sulfid which consists in intimately mixing and effecting a reaction between an alkali-metal salt of a volatile strong mineral acid and carboniferous sludge acid, normally containing at least five per cent. of homogeneously distributed carbon, subjecting the carboniferous sulfate produced to a sufficient temperature to promote the reduction of the greater part of such sulfate to sulfid and then recovering the resultant alkali-metal sulfid.

2. The process of making an alkali-metal sulfid which consists in intimately mixing and effecting a reaction between an alkali-metal chlorid and carboniferous sludge acid, normally containing at least five per cent. of homogeneously distributed carbon, subjecting the carboniferous sulfate product to a sufficient temperature to promote the reduction of the greater part of such sulfate to sulfid and then recovering the resultant alkali-metal sulfid.

3. The process of making an alkali-metal sulfid which consists in intimately mixing and effecting a reaction between sodium chlorid and carboniferous sludge acid, normally containing carbon, subjecting the carboniferous sulfate product to a sufficient temperature to promote the reduction of the greater part of such sulfate to sulfid and then recovering the resultant sodium sulfid.

4. In the process of making alkali-metal sulfid the step which consists in intimately mixing and effecting a reaction between an alkali-metal salt of a volatile strong mineral acid with a sludge acid comprising sulfuric acid and homogeneously distributed particles of carbon, while subjecting the mixture to a sufficiently high temperature to promote the reduction of the resulting product to alkali-metal sulfid.

5. In the process of making alkali-metal sulfid the step which consists in intimately mixing and effecting a reaction between alkali-metal chlorid and a sludge acid comprising sulfuric acid and homogeneously distributed particles of carbon, while subjecting the mixture to a sufficiently high temperature to promote the reduction of the resulting product to alkali-metal sulfid.

6. In the process of making sodium sulfid the step which consists in intimately mixing and effecting a reaction between sodium chlorid and a sludge acid comprising sulfuric acid and homogeneously distributed particles of carbon, while subjecting the mixture to a sufficiently high temperature to promote the reduction of the resulting product to sodium sulfid.

Signed at New York city, borough of Manhattan, county and State of New York, this 14th day of November, 1919.

WILLIAM H. LANDERS.